Oct. 28, 1947. G. E. WRIGHT 2,429,786
MULTIPLE TIRE SIDEWALL MOLD
Filed Feb. 11, 1944 4 Sheets-Sheet 1

Inventor
Grady Edward Wright
By Clarence A. O'Brien
and Harvey B. Jacobson
Attorneys

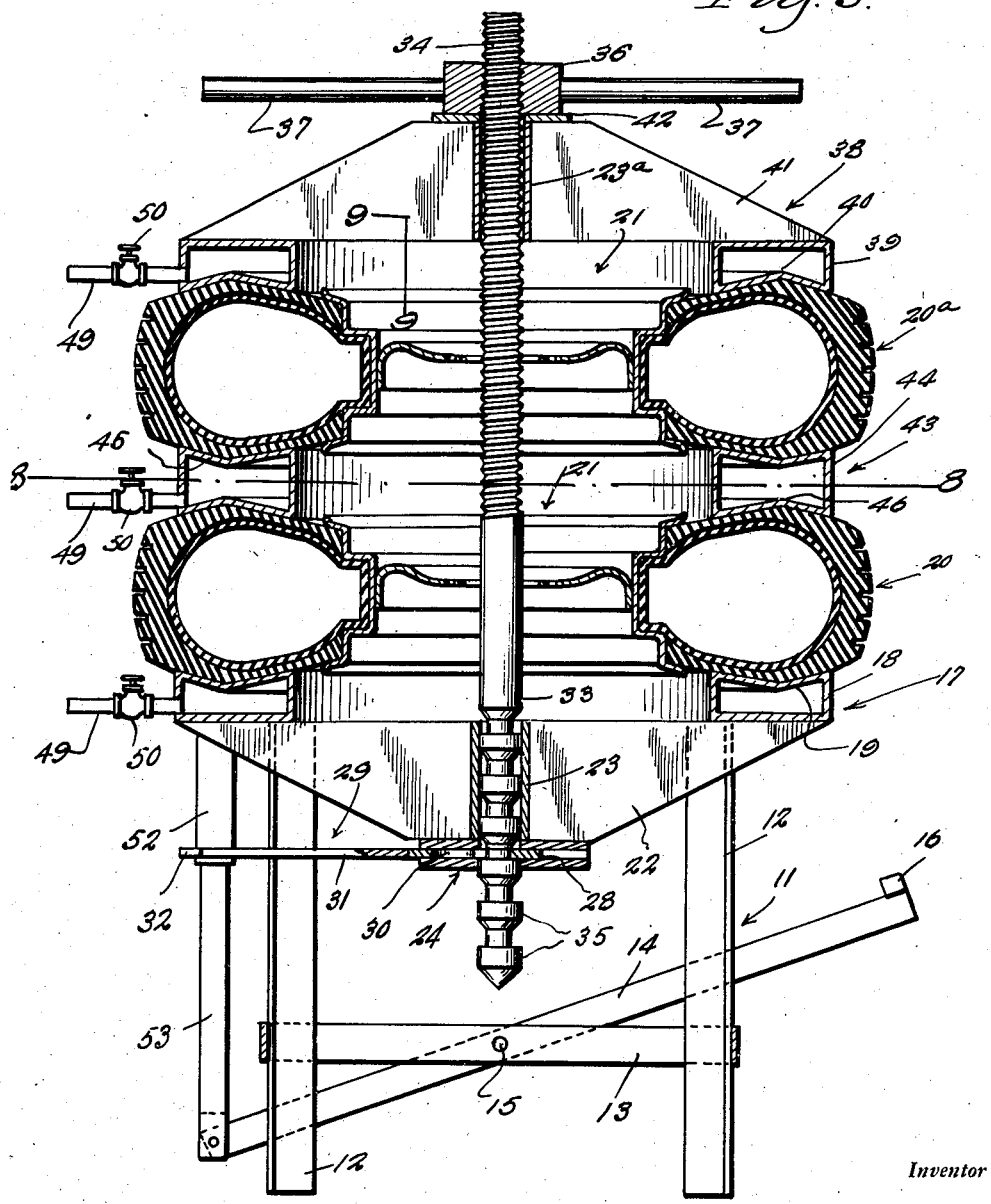

Oct. 28, 1947. G. E. WRIGHT 2,429,786
MULTIPLE TIRE SIDEWALL MOLD
Filed Feb. 11, 1944 4 Sheets-Sheet 3
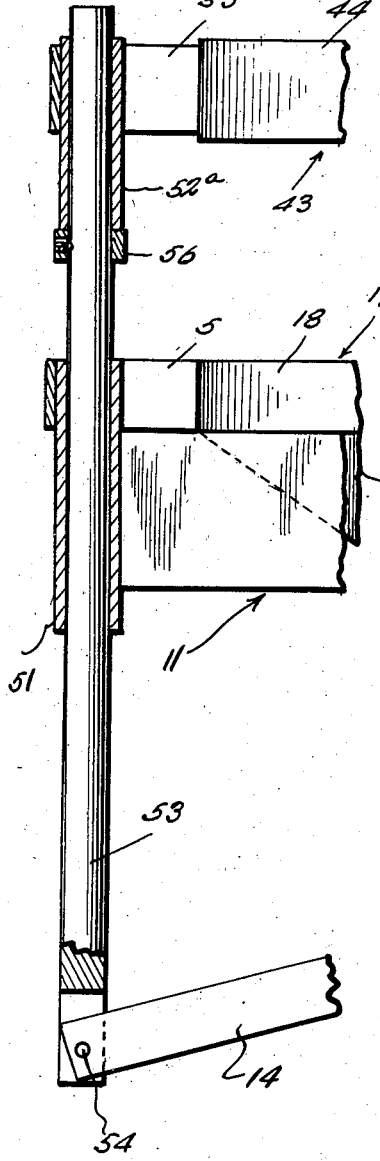
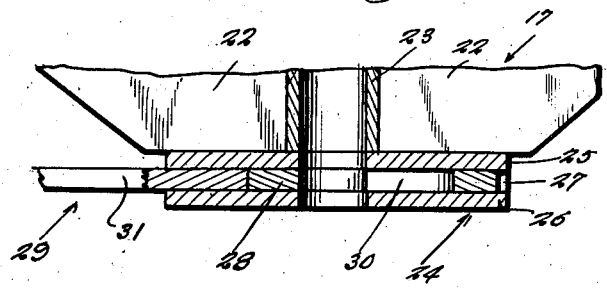
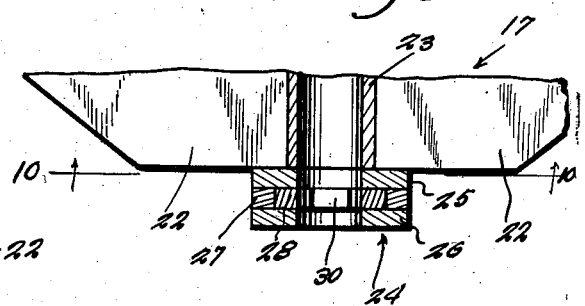
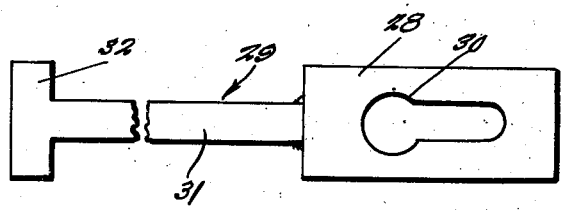
Inventor
Grady Edward Wright
By Clarence A. O'Brien
and Harvey B. Jacobson
Attorneys Oct. 28, 1947.  G. E. WRIGHT  2,429,786

MULTIPLE TIRE SIDEWALL MOLD

Filed Feb. 11, 1944  4 Sheets-Sheet 4

Inventor

Grady Edward Wright

By *Clarence A. O'Brien* and *Harvey B. Jacobson*
Attorneys

Patented Oct. 28, 1947

2,429,786

UNITED STATES PATENT OFFICE 2,429,786

MULTIPLE TIRE SIDEWALL MOLD

Grady Edward Wright, Waco, Tex.

Application February 11, 1944, Serial No. 521,969

3 Claims. (Cl. 18—18)

This invention relates to a multiple mold or vulcanizing structure for simultaneously handling and repairing sidewalls of pneumatic tire casings and the principal purpose is to provide a comparatively simple and expedient apparatus for readily and satisfactorily repairing cuts, scratches, and cracks occurring in the aforementioned sidewalls.

The tire repair machine or apparatus according to my invention is therefore so designed as to permit all work to be done while the tire and tube remain in place on the wheel, whereby time and attending labor is saved.

The arrangement according to my invention is chiefly characterized by two or more sidewall repair molds, arranged in spaced superposed relation, mounted on a base and provided with means for applying steam pressure and for clamping the co-acting series of molds.

In addition to the mold adjusting and clamping means, the structure also embodies, for use in conjunction with two or more tires, a central or intermediate mold unit and lever-controlled hoisting and pivoting means allowing said unit to be swung to one side to facilitate insertion and removal of the wheel and tire assemblies.

Other features and advantages will become more readily apparent from the following description and the accompanying illustrative drawings.

In the drawings wherein like reference numerals are employed to designate like or corresponding elements and parts:

Figure 3 is a central horizontal sectional view through either Figure 1 or Figure 2 as the case may be.

Figure 4 is a fragmentary detail sectional and elevational view employed to bring out the two-way center mold unit and lifting and pivoting means therefor.

Figure 5 is a fragmentary detail sectional and elevational view, this being taken somewhat centrally through the sheath and projectible and retractible locking bolt used in conjunction therewith.

Figure 6 is a view at right angles to the structure seen in Figure 5.

Figure 7 is a top plan view of the projectible and retractible locking bolt.

Figures 1, 2:
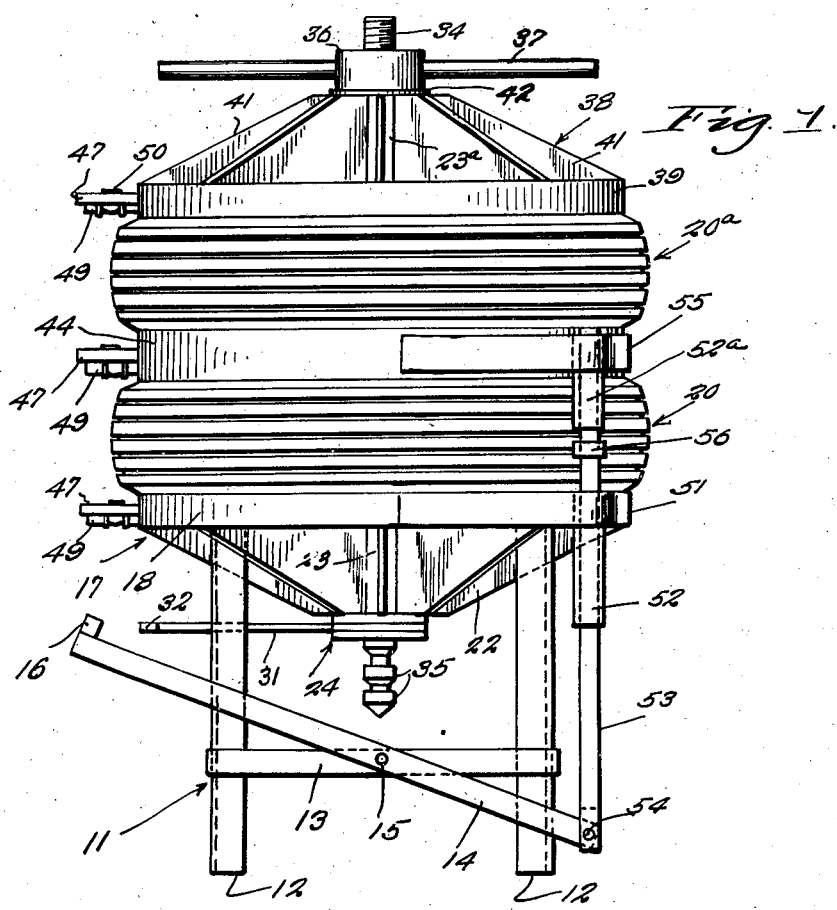
Figure 1 is a side elevational view of the machine or apparatus constructed in accordance with the principles of this invention and showing the manner in which several molds are assembled for simultaneously treating two wheel and tire assemblies.
Figure 2 is a top plan view of the arrangement depicted in Figure 1.

In the modification shown which illustrates an example for treating two tires the supporting table is designated by the reference numeral 11 (Figures 1 and 3).

This table is provided with legs 12 consisting of angle irons held and reinforced by a frame 13 arranged in their lower portion. A lever 14 is pivotally mounted at 15 on one of the frame members and projects beyond the frame structure and is provided with a foot-piece 16, the purpose of which will be described below. The lowermost and relatively fixed mold unit, indicated at 17, forms the top of the table. It comprises an annulus 18 of appropriate proportions whose top wall is of a curvature, as indicated at 19, to conform to the sidewall of the adjacent tire 20. It will be noticed in Figure 3 that the tire includes the casing and tube in the casing, both parts being mounted on the usual wheel 21. These parts form the assembly handled in the apparatus. Attached to the bottom wall of the mold are radially disposed suitably shaped reinforcing fins 22 which in conjunction with the central tubular hub member 23 form a spider. The mold unit and spider are joined together and both parts are mounted rigidly on the legs coacting with them to form the table structure. The numeral 24 designates a sheath of suitable shape and proportion attached to and cooperating with the hub-like tube or guide 23. From Figures 5 and 6 it will be seen that the sheath is made up of centrally apertured horizontal parallel plates 25 and 26 with marginal facers 27 therebetween. The sheath is of rectangular form and forms a slideway for the head portion 28 of the locking bolt 29. The head portion has a keyhole slot 30 therein which is registrable with the guide tube 23. The shank or operating member 31 is provided with a suitable handle 32. The locking bolt 29 is projectible and retractible in relation to the sheath and the keyhole slot has its relative open and narrow portions coacting selectively for registration with the guide tube 23.

Also coacting with the guide tube 23 is a perpendicular-centrally disposed clamping rod or member 33 whose upper end is screw-threaded as indicated at 34. The lower end is formed with longitudinally spaced grooves defining selectively usable detents 35. These detents slide through the guide tube 23 and coact with the keeper slot 30 in the head. By registering the large portion of the keeper slot with the tube 23 the detents can be slid freely up or down. Then when the bolt is in the desired hand-regulated position the locking bolt is moved from right to left as in Figure 3 in which position the detents are locked fixedly in said tube. An additional part of this clamping means is formed by a nut 36 on the upper threaded portion, having handles 37.

The upper mold and clamping unit is denoted by the numeral 38. It resembles the mold already described in that it includes a hollow annulus 39 with a suitably curved tire contact wall 40. There is also a spider arrangement embodying radial fins 41 attached to the annulus and secured at their inner ends to a guide tube 23a which aligns with the aforementioned tube 23. The fins are flattened adjacent their points of connection with said tube 23a to accommodate a thrust washer 42 interposed between the clamping nut 36 and said fins.

The remaining tire mold unit, which is arranged centrally between the two units 17 and 38 is denoted by the numeral 43. It comprises a hollow annulus 44 with its top and bottom walls 45 and 46 corresponding in shape to the aforementioned walls 19 and 40, the two walls engage the opposed side walls of the two tires 20 and 20a simultaneously.

Figure 8:
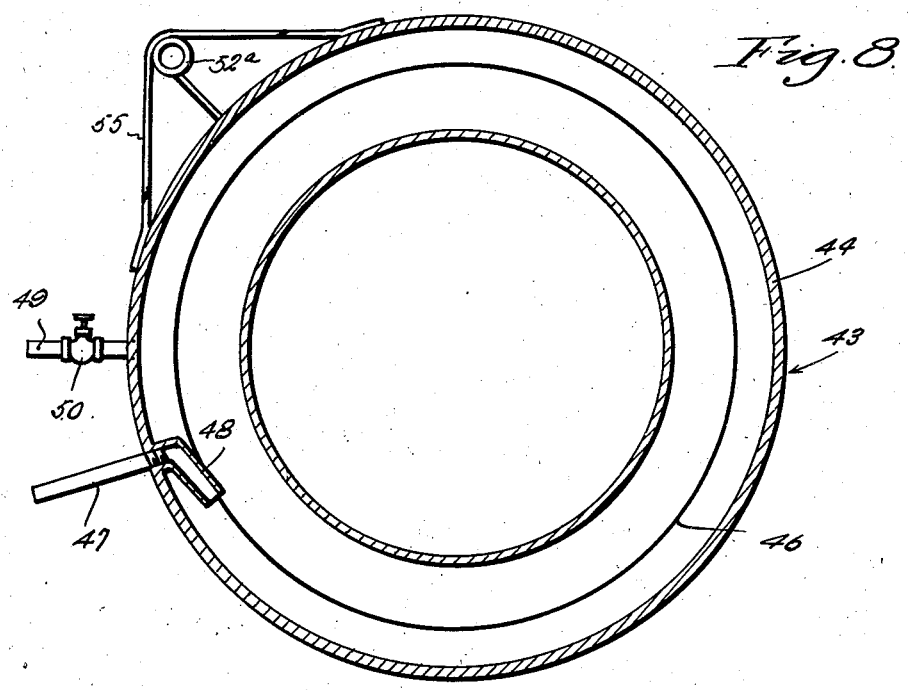
Figure 8 is a horizontal section on the plane of the line 8—8 of Figure 3.
Figure 9:
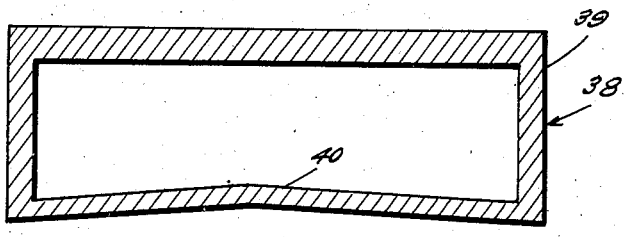
Figure 9 is a cross section on an enlarged scale, on the line 9—9 of Figure 3.
Figure 10:
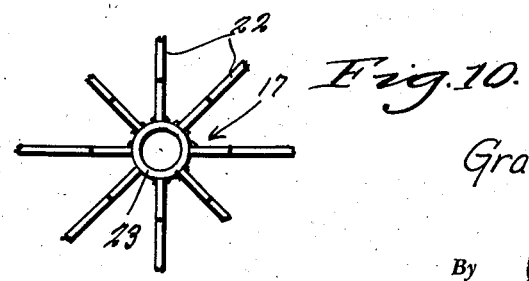
Figure 10 is a section which may be said to be taken approximately on the plane of the line 10—10 of Figure 6.

As shown in Figures 3 and 8, each annular member or ring constitutes a steam chamber. Attached to one peripheral portion is a steam induction pipe 47 connected with a lateral feeder nozzle 48. Adjacent to this pipe a coacting pipe 49 is arranged with a regulating valve 50, these parts serving for regulated escape of steam and condensation.

A V-shaped brace 51 (Figure 1) is provided on the lower mold unit 17 and carries a fixed guide sleeve 52 to accommodate a lifting and lowering rod 53. The lower end of the rod is bifurcated and pivotally connected as at 54 to the free end of the aforementioned lever 14. On the central mold unit is a corresponding V-shaped bracket or brace 55 having at its crotch portion a sleeve 52a in alignment with the sleeve 52. A thrust nut or equivalent shoulder 56 is mounted on the rod between the two sleeves. Thus, the upper end of the rod 53 serves for lifting and also as a fulcruming pivot for the upper bracket 55 and mold unit carried thereby. It is obvious that in order to swing the unit 43 in or out of alignment with the table structure it is necessary to remove the clamping member 33.

As before indicated, the machine or apparatus comprises a table-type steam heated sidewall vulcanizing mold structure with three curing units or plates, two of which have one curing surface and the other with the top and bottom or two curing surfaces. The last-named or central curing plate or unit is removable or can be swung out-of-the-way to one side as described. It is manifest that to include additional double curing units in the arrangement in order to handle more than two tire and wheel assemblies, merely the number of intermediate mold units 43 has to be increased with an additional sleeve 52a and bracket 55 added on rod 53 for each such unit.

The manner in which this machine operates is as follows:

The heat is derived from steam, the pressure and temperature required being controlled by the boiler in the shop in which it is installed; it should be operated at between 55 and 60 pounds steam.

The method of operation is as follows: The tire is prepared by cutting down the sidewall, cementing it and rebuilding the skived out places with new rubber as is done in the customary vulcanizing practice. The tire is mounted on a wheel with a curing tube inside, then placed on the mold where the curvature of the tire fits the curve of the mold. Then the top plate, which is also curved, is placed on top of the tire and the adjustments at the bottom are made to hold the parts of the structure as tightly as this mechanism permits. Then the top screw nut is tightened down to bring a reasonable pressure to bear on the tire, and the tire is inflated to 60 pounds of air so as to bring sufficient pressure upon the new rubber to mold it to the shape of the tire when it is melted and cured by the heat from the mold. The mold is designed to cure two or more tires by simply inserting the center curing plate or plates, and following the same method of operation by tightening down the adjustment screw in the same method as was followed on one tire.

The method of inducting steam: The steam is inducted in each plate or heat unit through an angle pipe at the top of each plate or mold. A short distance in the opposite direction from the angle at the bottom of the plate there is an exhaust pet cock or valve which permits a small amount of steam to escape at all times and discharges the condensation.

Changes in the shape, size and arrangement of details coming within the field of invention claimed may be resorted to in actual practice, if desired and modifications of the apparatus as described by way of example are therefore not necessarily departures from the invention.

Having described the invention, what is claimed as new is:

1. A pneumatic tire sidewall vulcanizing and repair molding machine of the class described comprising a table including a stand having legs, a mold unit mounted rigidly atop said legs, a second complemental mold unit, V-shaped brackets attached to said mold units and disposed in vertical alignment and provided with guide sleeves; a lifting and lowering rod slidable through said sleeves; said rod having a collar adapted to coact with the upper sleeve, that portion of the rod above said shoulder constituting a pivot to permit said second-mold unit to be swung in a horizontal plane in or out in respect to the table, a foot lever pivoted on said table, one end of said foot lever being operatively connected with the lower end of said lifting and lowering rod.

2. A pneumatic tire vulcanizer comprising a horizontal table support, hollow steam heated vulcanizing molds including a lower and an upper mold, each provided with heated tire vulcanizing surfaces on its upwardly and on its downwardly facing sides, respectively, at least one intermediate double acting mold, provided with heated tire vulcanizing surfaces on both its upwardly and downwardly facing sides, means for pressing the molds against the material to be vulcanized and means for lifting the intermediate mold vertically and for swinging it around a vertical pivot so as to swing it clear of the working space of the mold underneath.

3. A pneumatic tire vulcanizer comprising a horizontal table support, hollow steam heated vulcanizing molds including a lower and an upper mold each provided with heated tire vulcanizing surfaces on its upwardly and on its downwardly facing sides respectively, at least one intermediate double acting mold, provided with heated tire vulcanizing surfaces on both its upwardly and downwardly facing sides, means for pressing the molds against the material to be vulcanized, a means for lifting the intermediate double acting mold and for swinging it clear of the mold underneath, said means comprising a lifting rod arranged for vertical axial movement, a lifting member on said rod, a tubular sleeve member eccentrically arranged on the intermediate double acting mold, adapted to rotate around said rod and providing a means for lifting said intermediate double acting mold along said rod and for rotating it around its vertical axis as a pivot, guiding means for the lifting rod and an operating lever linked to said lifting rod for the vertical axial shifting of the same.

GRADY EDWARD WRIGHT.

REFERENCES CITED

The following references are of record in the file of this patent:

UNITED STATES PATENTS

| Number | Name | Date |
|---|---|---|
| 2,028,618 | Macbeth | Jan. 21, 1936 |
| 2,029,060 | Cozzo | Jan. 28, 1936 |
| 2,169,146 | Iverson | Aug. 8, 1939 |
| 2,147,339 | Glynn | Feb. 14, 1939 |
| 2,295,438 | Vaniman | Sept. 8, 1942 |
| 1,234,065 | Miller | July 17, 1917 |
| 1,357,617 | Crush | Nov. 2, 1920 |